United States Patent
Kakarla et al.

(10) Patent No.: US 8,209,417 B2
(45) Date of Patent: Jun. 26, 2012

(54) DYNAMIC RESOURCE PROFILES FOR CLUSTERWARE-MANAGED RESOURCES

(75) Inventors: Sarat B. Kakarla, Santa Clara, CA (US); Gaurav Kumar, Palo Alto, CA (US); Ashwinee B. Khaladkar, Mountain View, CA (US); Alok K. Srivastava, Newark, CA (US); Juan Tellez, Piedmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 11/716,244

(22) Filed: Mar. 8, 2007

(65) Prior Publication Data

US 2008/0222642 A1    Sep. 11, 2008

(51) Int. Cl.
    G06F 15/173    (2006.01)
    G06F 11/00    (2006.01)
(52) U.S. Cl. .......................................... 709/226; 714/13
(58) Field of Classification Search .................. 709/226, 709/221; 707/204; 714/7, 13
    See application file for complete search history.

(56) References Cited

U.S. PATENT DOCUMENTS

| | | | | |
|---|---|---|---|---|
| 5,093,912 A * | 3/1992 | Dong et al. | ................... | 718/104 |
| 5,103,393 A * | 4/1992 | Harris et al. | ................... | 709/226 |
| 5,165,018 A * | 11/1992 | Simor | ........................... | 709/222 |
| 5,459,857 A * | 10/1995 | Ludlam et al. | ............... | 714/6.12 |
| 5,659,786 A * | 8/1997 | George et al. | ................ | 713/100 |
| 5,682,529 A * | 10/1997 | Hendry et al. | ............... | 713/100 |
| 5,727,208 A * | 3/1998 | Brown | ........................... | 713/100 |
| 5,765,140 A * | 6/1998 | Knudson et al. | ............. | 705/7.15 |
| 5,784,563 A * | 7/1998 | Marshall et al. | ............. | 709/221 |
| 5,822,531 A * | 10/1998 | Gorczyca et al. | ............. | 709/221 |
| 5,826,082 A * | 10/1998 | Bishop et al. | ................. | 718/104 |
| 5,881,284 A * | 3/1999 | Kubo | ............................. | 718/100 |
| 5,890,014 A * | 3/1999 | Long | ................................ | 710/8 |
| 5,918,017 A * | 6/1999 | Attanasio et al. | ............. | 709/224 |
| 5,948,112 A * | 9/1999 | Shimada et al. | ................ | 714/16 |
| 6,003,075 A * | 12/1999 | Arendt et al. | ................. | 709/221 |
| 6,009,274 A * | 12/1999 | Fletcher et al. | ............... | 717/173 |
| 6,097,882 A * | 8/2000 | Mogul | ........................ | 709/201 |

(Continued)

OTHER PUBLICATIONS

Newlan et al., Using Oracle Clusterware to Protect Single Instance Database, An Oracle White Paper, Version 1.06, pp. 2-28, (Nov. 2006).

(Continued)

*Primary Examiner* — Firmin Backer
*Assistant Examiner* — Michael A Chambers
(74) *Attorney, Agent, or Firm* — Hickman Palermo Truong Becker Bingham Wong LLP (57) ABSTRACT

Allowing for resource attributes that may change dynamically while the resource is in use, provides for dynamic changes to the manner in which such resources are managed. Management of dynamic resource attributes by clusterware involves new entry points to clusterware agent modules, through which resource-specific user-specified instructions for discovering new values for resource attributes, and for performing a user-specified action in response to the new attribute values, are invoked. A clusterware policy manager may know ahead of time that a particular resource has dynamic attributes or may be notified when a resource's dynamic attribute has changed and, periodically or in response to the notification, request that the agent invoke the particular resource-specific instructions for discovering new values for attributes for the particular resource and/or for performing a user-specified action in response to the new attribute values. During the majority of this process, the resource remains available.

30 Claims, 3 Drawing Sheets

U.S. PATENT DOCUMENTS

| | | | | |
|---|---|---|---|---|
| 6,097,886 | A * | 8/2000 | Dave et al. | 703/23 |
| 6,108,699 | A * | 8/2000 | Moiin | 709/221 |
| 6,151,688 | A * | 11/2000 | Wipfel et al. | 714/48 |
| 6,154,878 | A * | 11/2000 | Saboff | 717/173 |
| 6,182,119 | B1 * | 1/2001 | Chu | 709/206 |
| 6,185,619 | B1 * | 2/2001 | Joffe et al. | 709/229 |
| 6,185,734 | B1 * | 2/2001 | Saboff et al. | 717/164 |
| 6,192,401 | B1 * | 2/2001 | Modiri et al. | 709/220 |
| 6,192,483 | B1 * | 2/2001 | Moiin et al. | 714/4.4 |
| 6,195,680 | B1 * | 2/2001 | Goldszmidt et al. | 709/203 |
| 6,195,750 | B1 * | 2/2001 | Ellsworth | 713/100 |
| 6,219,786 | B1 * | 4/2001 | Cunningham et al. | 713/152 |
| 6,226,684 | B1 * | 5/2001 | Sung et al. | 709/238 |
| 6,243,744 | B1 * | 6/2001 | Snaman et al. | 709/220 |
| 6,247,141 | B1 * | 6/2001 | Holmberg | 714/2 |
| 6,256,675 | B1 * | 7/2001 | Rabinovich | 709/241 |
| 6,304,980 | B1 * | 10/2001 | Beardsley et al. | 714/6.23 |
| 6,311,232 | B1 * | 10/2001 | Cagle et al. | 710/8 |
| 6,338,112 | B1 * | 1/2002 | Wipfel et al. | 710/269 |
| 6,343,360 | B1 * | 1/2002 | Feinleib | 713/1 |
| 6,353,898 | B1 * | 3/2002 | Wipfel et al. | 714/48 |
| 6,363,077 | B1 * | 3/2002 | Wong et al. | 370/422 |
| 6,401,120 | B1 * | 6/2002 | Gamache et al. | 709/226 |
| 6,424,992 | B2 * | 7/2002 | Devarakonda et al. | 709/203 |
| 6,427,163 | B1 * | 7/2002 | Arendt et al. | 709/201 |
| 6,438,652 | B1 * | 8/2002 | Jordan et al. | 711/120 |
| 6,445,709 | B1 * | 9/2002 | Chiang | 370/399 |
| 6,449,641 | B1 * | 9/2002 | Moiin et al. | 709/220 |
| 6,453,426 | B1 * | 9/2002 | Gamache et al. | 714/4.21 |
| 6,470,389 | B1 * | 10/2002 | Chung et al. | 709/227 |
| 6,470,436 | B1 * | 10/2002 | Croft et al. | 711/206 |
| 6,513,115 | B2 * | 1/2003 | Nock et al. | 713/100 |
| 6,526,432 | B1 * | 2/2003 | Briskey et al. | 709/201 |
| 6,532,494 | B1 * | 3/2003 | Frank et al. | 709/224 |
| 6,539,381 | B1 * | 3/2003 | Prasad et al. | 1/1 |
| 6,615,256 | B1 * | 9/2003 | van Ingen et al. | 709/220 |
| 6,622,159 | B1 * | 9/2003 | Chao et al. | 709/203 |
| 6,662,219 | B1 * | 12/2003 | Nishanov et al. | 709/220 |
| 6,714,949 | B1 * | 3/2004 | Frey, Jr. | 1/1 |
| 6,748,429 | B1 * | 6/2004 | Talluri et al. | 709/221 |
| 6,871,344 | B2 * | 3/2005 | Grier et al. | 717/162 |
| 6,889,253 | B2 * | 5/2005 | Griffin et al. | 709/221 |
| 6,965,936 | B1 * | 11/2005 | Wipfel et al. | 709/224 |
| 7,093,155 | B2 * | 8/2006 | Aoki | 714/4.11 |
| 7,107,485 | B2 * | 9/2006 | Baba et al. | 714/13 |
| 7,234,073 | B1 * | 6/2007 | Roytman et al. | 714/4.11 |
| 7,281,045 | B2 * | 10/2007 | Aggarwal et al. | 709/226 |
| 7,437,445 | B1 * | 10/2008 | Roytman et al. | 709/223 |
| 7,464,147 | B1 * | 12/2008 | Fakhouri et al. | 709/223 |
| 7,467,322 | B2 * | 12/2008 | Baba | 714/4.11 |
| 7,478,230 | B2 * | 1/2009 | Mizoguchi | 713/1 |
| 2001/0053223 | A1 * | 12/2001 | Ishibashi et al. | 380/231 |
| 2002/0075870 | A1 * | 6/2002 | de Azevedo et al. | 370/390 |
| 2002/0082811 | A1 * | 6/2002 | Honjas et al. | 703/2 |
| 2002/0107977 | A1 * | 8/2002 | Dunshea et al. | 709/238 |
| 2002/0120724 | A1 * | 8/2002 | Kaiser et al. | 709/221 |
| 2002/0198968 | A1 * | 12/2002 | Shirriff | 709/220 |
| 2003/0074428 | A1 * | 4/2003 | Haines | 709/220 |
| 2003/0101245 | A1 * | 5/2003 | Srinivasan et al. | 709/221 |
| 2004/0205148 | A1 * | 10/2004 | Bae et al. | 709/213 |
| 2005/0050198 | A1 * | 3/2005 | Mizoguchi | 709/224 |
| 2005/0050200 | A1 * | 3/2005 | Mizoguchi | 709/226 |
| 2005/0120259 | A1 * | 6/2005 | Aoki | 714/5 |
| 2005/0268154 | A1 * | 12/2005 | Wipfel et al. | 714/4 |
| 2005/0289388 | A1 * | 12/2005 | Black-Ziegelbein et al. | 714/7 |
| 2006/0015296 | A1 * | 1/2006 | Aoki et al. | 702/185 |
| 2006/0047813 | A1 * | 3/2006 | Aggarwal et al. | 709/226 |
| 2006/0168192 | A1 * | 7/2006 | Sharma et al. | 709/224 |
| 2006/0224728 | A1 * | 10/2006 | Baba | 709/224 |
| 2007/0220149 | A1 * | 9/2007 | Kawashima et al. | 709/226 |
| 2007/0220323 | A1 * | 9/2007 | Nagata | 714/13 |
| 2007/0288585 | A1 * | 12/2007 | Sekiguchi et al. | 709/209 |
| 2008/0016129 | A1 * | 1/2008 | Edlund et al. | 707/204 |
| 2008/0162983 | A1 * | 7/2008 | Baba et al. | 714/3 |
| 2008/0222159 | A1 * | 9/2008 | Aranha et al. | 707/10 |
| 2010/0235488 | A1 * | 9/2010 | Sharma et al. | 709/223 |

OTHER PUBLICATIONS

Knapp, et al. "Using Oracle Clusterware to Protect Application Server", An Oracle White Paper, pp. 2-27, (Nov. 2005).

Newlan, "Using Oracle Clusterware to Protect 3$^{rd}$ Party Applications", An Oracle White Paper, pp. 2-23, (May 2005).

* cited by examiner

DYNAMIC RESOURCE PROFILES FOR CLUSTERWARE-MANAGED RESOURCES

FIELD OF THE INVENTION

The present invention relates generally to data management and, more specifically, to techniques for managing clusterware-managed resources having dynamic attributes.

BACKGROUND

A clustered computing system is a collection of interconnected computing elements that provide processing to a set of client applications and, to a large extent, can be viewed as though the computing elements are a single computer. Each of the computing elements is referred to as a node. A node may be a computer interconnected to other computers, or a server blade interconnected to other server blades in a grid. A group of nodes in a clustered computing system that have shared access to storage (e.g., have shared disk access to a set of disk drives or other non-volatile storage) and that are connected via interconnects is referred to herein as a cluster.

A clustered computing system is used to host clustered servers. Resources from multiple nodes in a clustered computing system can be allocated to running a server's software. Each allocation of the resources of a particular node for the server is referred to herein as a server instance, or simply an instance. A database server can be clustered, where the server instances may be collectively referred to as a cluster. Each instance of a database server facilitates access to the same database, in which the integrity of the data is managed by a global lock manager. The collection of server instances, and the resources used by the servers, are typically managed by a "clusterware" software application.

Figure 1:
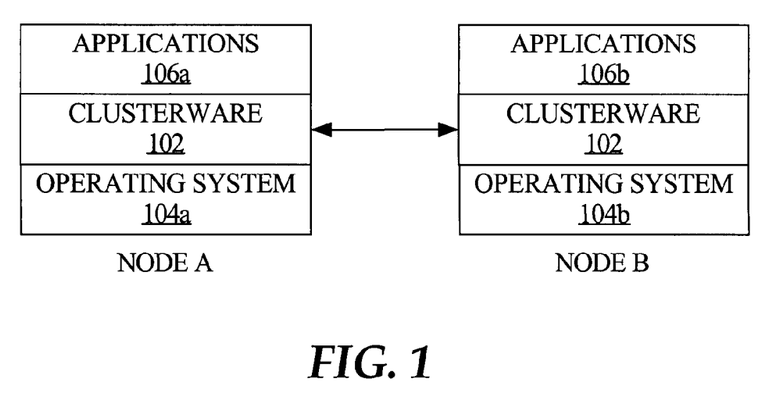
FIG. 1 is a block diagram that illustrates a two-node clustered computing system.

FIG. 1 is a block diagram that illustrates a two-node clustered computing system. Clusterware 102 is software that allows clusters of networked computers, such as Node A and Node B, to operate or be controlled as if they are one. Clusterware 102 operates between two or more nodes in a group of computers, typically at a layer just on top of the operating system 104. One function of clusterware 102 is to manage applications 106 running on the cluster nodes, including the cluster resources used by the various applications 106 running on the cluster. Some typical behavioral goals of clusterware are, for example, to ensure high availability fail-over processing within the cluster and to balance the workload across the nodes in the cluster. Various events may change the management behavior of the clusterware relative to certain cluster applications and/or cluster resources. For example, a change in the value of a resource's attribute could change the manner in which the clusterware manages and otherwise handles that resource, e.g., in the event of a node and/or cluster crash.

Resources managed by clusterware 102 can have certain attributes that may need to be changed at any point in time, and where values for such attributes may not be known at the time of configuration of the clusterware. If an attribute of an online resource needs to be modified, the system administrator has to stop the resource, modify the particular attribute and start the resource again. Thus, this approach involves stopping the resource and all the other resources that may depend on the resource, which may potentially lead to relatively long periods of outage time for numerous resources. Therefore, this approach negates the objective of a high-availability system to always provide availability of the cluster resources that the clusterware 102 manages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Allowing for dynamic resource attributes, i.e., resource attributes that may change dynamically while the resource is in use, provides for dynamic changes to the manner in which such resources are managed. For example, cluster resources having dynamic attributes, when such attributes are dynamically changed, may trigger clusterware that is managing such resources to begin managing the resources differently, i.e., according to a different resource management behavior.

Management of dynamic resource attributes by clusterware involves a new entry point to clusterware agent modules, through which resource-specific user-specified instructions for discovering new values for resource attributes are invoked. For example, a clusterware policy manager may know ahead of time that a particular resource has dynamic attributes or may be notified when a resource's dynamic attribute has changed and, periodically or in response to the notification, the policy manager requests that the agent invoke the particular resource-specific instructions for discovering new values for one or more resource attributes for the particular resource.

Management of dynamic resource attributes by clusterware involves a second new entry point to clusterware agent modules, through which resource-specific user-specified instructions for performing a user-specified action in response to the new attribute value are invoked. Hence, in response to a particular resource attribute being changed to a new value, a user can specify any type of action in response to the attribute value change.

These new clusterware agent entry points enable dynamic resource attributes, discovery of attribute value changes, and responsive user-specified actions. During the majority of this process, the resource does not need to be stopped and remains online.

The techniques described herein allow for greater flexibility in defining and configuring resources, in that a resource can have dynamic attributes whose values can be changed and discovered at any time. Consequently, a system administrator need not be burdened with monitoring and changing attribute values that are changing dynamically at run time, so these techniques help save valuable manpower that may otherwise be needed to constantly monitor clusterware and the applications the clusterware monitors. Furthermore, these techniques provide better fault tolerance and ensure continuous availability for resources that have dynamically changing attributes.

Example Operating Environment-Clusterware

Figure 2:
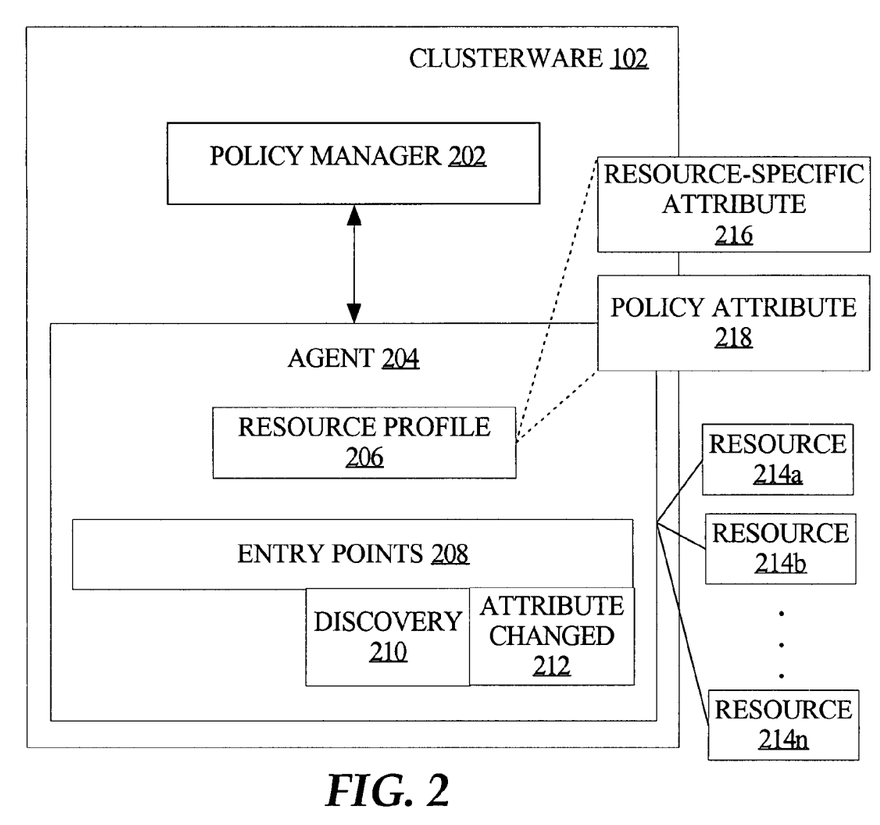
FIG. 2 is a block diagram illustrating an example operating environment, in which an embodiment of the invention may be implemented.

FIG. 2 is a block diagram illustrating an example operating environment, in which an embodiment of the invention may be implemented. The example operating environment comprises clusterware 102, which comprises a policy manager 202 and an agent 204. Policy manager 202 has access to one or more resource profile 206 residing in association with the agent 204. Agent 204 comprises or is associated with resource profile 206, and a plurality of entry points 208 for resource type specific instructions which, when executed, perform one or more steps to perform a certain operation. Alternatively, resource profile 206 could reside in association with policy manager 202. For example, agent 204 comprises start and stop entry points, as well as a discovery 210 entry point and an attribute changed 212 entry point. Agent 204 is configured to manage any number and type of cluster resources used by applications executing on the cluster, such as resources 214a, 214b-214n (generally and collectively referred to as resources 214).

As discussed, clusterware 102 is software that allows clusters of networked computers to operate or be controlled as if they are one, where one function of clusterware 102 is to manage applications 106 (FIG. 1) running on the cluster nodes, including the cluster resources used by the various applications 106 running on the cluster nodes, and possibly including the applications 106 themselves. Resources 214 depict any number or type of manageable entities, either hardware or software, that are utilized by clusterware 102 and/or by applications being managed by clusterware 102. For non-limiting examples, resources 214 may include a virtual IP address, a network card, a port, a connection, a physical disk, a database server, an application server, an application, a web server, etc. Each resource 214 or each type of resource 214 is associated with a corresponding resource profile 206, which defines and possibly maintains values for one or more resource-specific attributes 216 and one or more policy attributes 218. For non-limiting examples, a virtual IP address resource may have resource-specific attributes 216 such as a corresponding IP address, an interface name, and a subnet address; and a database resource may have resource-specific attributes 216 such as resource name, resource type, database unique name, and timeout value.

A non-limiting example of a resource profile for a virtual IP address (resource type "VIP") named "ora.vip" is as follows:

NAME=ora.vip
TYPE=VIP
ACTION_SCRIPT=/home/skakarla/tmp/profile/vip.scr
ACTIVE_PLACEMENT=1
AUTO_START=1

-continued

CHECK_INTERVAL=60
DESCRIPTION=CRS application for VIP on a node
FAILOVER_DELAY=0
FAILURE_INTERVAL=0
FAILURE_THRESHOLD=0
HOSTING_MEMBERS=stadr14
PLACEMENT=favored
REQUIRED_RESOURCES=
RESTART_ATTEMPTS=6
SCRIPT_TIMEOUT=60
$IPADDR={"", 20D} //intial value set to NULL, and value expires every 20 days.
$DB_NAME={"", 0} //initial value set to NULL, and value never expires.
$FOO_ATTR={"defaultValue", 2D}, //initial value is defaultValue and the attribute's new value is automatically discovered every 2 days.
$FOO_ATTR2={"", "6AM, 7PM"} // the attribute's value is discovered every day at 6AM and 7PM In the foregoing example, the resource's discoverable dynamic attributes are identified with a preceding '$' symbol. However, other symbols, numbers, or characters could be used for the purpose of distinguishing a resource's dynamic attributes from the resource's static attributes within a resource profile.

Resources' discoverable dynamic attributes can have a time period associated with it, indicating how long that particular attribute value is valid. Once that time expires, the policy manager 202 (FIG. 2) needs to rediscover the attribute value. For example, consider the following attribute, $fooattribute={"foovalue", 20D}, where "$" identifies the "fooattribute" as a dynamic attribute. In this example attribute declaration, the first parameter represents the default value for that attribute, and the second parameter indicates how long an attribute value is valid once it has been initialized (i.e., an expire time), i.e., when the value of that attribute should be rediscovered. If a default value is absent, the clusterware 102 (FIG. 2) will discover the value of "fooattribute" upon creation of the resource. After that, the clusterware 102 can use the expire time as a heuristic for determining when to rediscover that particular attribute.

To assist the clusterware 102 in managing resources 214, the clusterware 102 comprises a policy manager 202. For example, policy manager 202 may be implemented as a daemon process running in clusterware 102. However, the policy manager architecture with which embodiments of the invention are implemented may vary from implementation to implementation. Policy manager 202 manages each resource 214a, 214b-214n based on policy attributes 218 specified in a corresponding resource profile 206. Stated otherwise, policy manager 202 makes decisions for the cluster regarding cluster resources, such as what to do when a node crashes. For a non-limiting example, a resource policy attribute 218 associated with a particular type of resource 214a, such as a database server, may specify that at least one instance of the database server must always run in the cluster and that the database server instances are configured to operate in a failover manner in the event of a failure of node on which a server is executing.

Generally, the policy attributes 218 of resource profile 206 provide a source of information for policy manager 202 to use in making decisions about a corresponding resource, in the context of resource management goals of clusterware 102, e.g., a high availability goal of always having cluster resources available for certain numbers or types of applications to execute and operate correctly on the cluster. For example, the policy attributes 218 may characterize one or more rules that the policy manager 202 evaluates in response to discovering a resource attribute change via discovery 210 entry point, in response to which the policy manager 202 can cause performance of a certain action associated with clusterware 102 management of resources 214. Any action associated with the clusterware 102 management of resources 214 is in addition to any user-specified action performed, via attribute changed 212 entry point, in response to discovering a resource attribute change via discovery 210 entry point. The policy manager 202 does not understand the different specific resources 214 in depth, so the policy manager 202 makes decisions based on the policy attributes 218 at a relatively abstract level. For example, the policy manager 202 does not know how to communicate with various applications running on the cluster and therefore using cluster resources, such as a database server, an application server, and a web server.

Hence, clusterware 102 further comprises one or more agent 204. Each agent 204 is specific to a particular type of resource managed by the clusterware 102, i.e., is resource type-specific. Thus, each agent 204 is configured to assist with managing a corresponding particular type of resource. For example, each different type of resource from resources 214a, 214b-214n is associated with a different corresponding agent 204. Each agent 204 generally comprises two different sets of instructions: (a) instructions for clusterware management of resources, generally, and (b) user-specified instructions for management of particular resources, specifically. It is possible that each different type of resource is different and, therefore, has different operational behavior. Thus, each agent 204 includes some resource-specific user-specified code about how to manage the resource, such as how to start the resource, how to stop the resource, and how to check the resource state. These types of actions are usually specific to the type of resource and vary from resource type to resource type.

Consequently, agent 204 comprises programmatic entry points 208, which provide programmatic means (e.g., application programming interfaces, API's) for invoking user-specific code for managing and otherwise affecting the corresponding resource. For example, each of the following actions, (a) start the resource, (b) stop the resource, and (c) check the resource state, are associated with corresponding entry points 208 in agent 204, at which the user-specified instructions associated with the particular action can be invoked to cause performance of the particular action. In this context, the user that specifies the user-specified code for performing various actions associated with a particular resource may be, for non-limiting examples, a developer who developed the particular resource or a system administrator who is familiar with how the particular resource operates and is to be managed. Agent 204 has access to resource profile 206, for accessing the resource-specific attributes 216 associated therewith, for use in performing corresponding actions in managing corresponding resources 214.

As mentioned, each agent 204 manages the corresponding resources through user plugged-in code called as entry points. For example, if an entity decides to start a resource, the entity tells the resource type-specific agent to start the resource, and then the agent invokes the START entry point (which is implemented by users for that specific resource). To develop agents, users simply have to implement their entry points and link with an AgentFramework library provided by clusterware 102.

For example, if a user wants to manage an IP address using clusterware 102, the user develops an agent which manages the IP address using a file similar to the following example, which includes start, stop, monitor, and discovery entry points:

| vipagent.cpp |
|---|
| start( )<br>{<br>    plumb the ip address using ifconfig command.<br>}<br>stop( )<br>{<br>    unplumb the ip address using ifconfig command.<br>}<br>monitor( )<br>{<br>    ping the ip address to check the health of ip address.<br>}<br>Discovery( )<br>{<br>    discover IP address from DNS server.<br>} |

Agents 204 for different resource types are developed by writing the code for the entry points and linking the entry points with a certain clusterware 102 library. Thus, agents 204 contains two parts: clusterware library plus user code (in form of entry points). The policy manager 202 decides when to call these entry points. Thus, whenever an attribute needs to be discovered, policy manager 202 calls the discovery entry point 210 through an appropriate resource type-specific agent 204.

Discovery and Attribute Changed Entry Points

According to an embodiment, agent 204 comprises a discovery 210 entry point. Discovery 210 is an entry point 208 for invoking resource type-specific code which, when invoked, executes to discover the current value for one or more attributes associated with a particular resource type. For a non-limiting example, a user develops a set of instructions which, when executed, cause performance of one or more operations for discovering a new IP address for a virtual IP address resource. Through a programmatic interface, the user inserts or references the set of "discovery" instructions within the agent 204, so that the instructions are invokable at the discovery 210 programmatic entry point of agent 204. Because the nature and behavior of resources vary from resource type to resource type, what operations need to be performed to discover a particular resource's new attribute value will also likely vary from resource type to resource type. Hence, the discovery 210 entry point effectively extends the agent 204 functionality to include the capability to invoke resource type-specific instructions for discovering a change to the value of a resource's attribute.

Dynamic resource attributes may change in multiple scenarios, as follows. With a manual intervention, for example, a system administrator may change an attribute of a resource (e.g., a database's uniqueName attribute). The agent 204 can inform the policy manager 202 about the change through the discovery 210 entry point. With a semi-automatic resource attribute change, for example, at the time of initial configuration of the clusterware 102 certain attributes of a resource may not have values set. The policy manager 202 notices that certain attribute values are not set and starts a process to request the agent 204 to query the values of the particular attributes to determine if the values are now set, and to return such values. With an automatic resource attribute change, for example, an attribute value may be invalidated after a certain time interval. Therefore, the attribute value needs to be queried as a result of the invalidation. For example, the agent 204 may inform the policy manager 202 of the expiration of a lease for a certain attribute and the policy manager 202 in turn requests the agent 204 query the new value of the certain attribute to ensure that the policy manager 202 is aware of the most current attribute information. With scheduled resource attribute discovery, discoverable attributes can have an associated schedule, with which users can specify specific intervals of time when an attribute value needs to be discovered. For example, a command such as or similar to the one that follows could be used to specify an attribute discovery schedule: $fooAttribute={"defaultValue", "6 AM, 7 PM"}. The foregoing ways in which a dynamic resource attribute may change (i.e., manual, semi-automatic, and automatic) and/or be scheduled for discovery are resource attribute discovery triggers because each could trigger, directly or indirectly, execution of a process for discovering the value of a dynamic attribute of a resource as described herein.

A dynamic resource refers to a resource having one or more attributes that are dynamic in the sense that the value for each of the one or more attributes may change. Such changes may occur at runtime when the resource is in use, or otherwise. The techniques described herein enable a resource to be a dynamic resource. According to an embodiment, syntactic means are provided to identify a particular resource as being a dynamic resource. For example, the name of a dynamic resource may be preceded by a certain character, i.e., a syntactic identifier such as a '$' or '&', in a corresponding resource profile, thereby indicating that at least one dynamic attribute is associated with the particular resource. Based on the techniques described herein, identifying a resource as a dynamic resource effectively identifies the resource as having one or more discoverable attributes, whereby the agent 204 can call the discovery 210 entry point for that specific resource to discover the appropriate value for discoverable attributes, by executing the corresponding user-provided discovery 210 entry point code.

Generally, who or what needs to be notified when a resource attribute changes depends on the nature and type of attribute that changed. For example, in addition to the agent 204, the resource itself may need to know and/or other resources may need to know, such as resources that are dependent on the changed resource. According to an embodiment, agent 204 comprises an attribute changed 212 entry point. Attribute changed 210 is an entry point 208 for invoking resource type-specific code which, when invoked, executes to perform a user-specified action in response to a change to a change in value for one or more attributes associated with a particular resource type. For a non-limiting example, a user develops a set of instructions which, when executed, cause performance of essentially any action in response to the change in resource attribute value. Through a programmatic interface, the user inserts or references the set of "resource attribute changed" instructions within the agent 204, so that the instructions are invokable at the attribute changed 212 programmatic entry point of agent 204. Because the nature and behavior of resources vary from resource type to resource type and the type of action desired in response to a resource attribute change is relatively unlimited, what operations need to be performed in response to a particular resource's changed attribute value will also likely vary from resource type to resource type and possibly from resource attribute to resource attribute. Hence, the attribute changed 212 entry point effectively extends the agent 204 functionality to include the capability to invoke resource type-specific instructions for performing one or more user-defined action in response to discovering a change to the value of a resource's attribute.

Following is example pseudo-code which shows usage of the discovery 210 entry point (i.e., "Discovery") and the attribute changed 212 (i.e., "ResAttrModified") entry point, as well as Start, Stop, and Check entry points:

```
FooStart( )
{
// starts the FOO resource.
}
FooStop( )
{
  // stops the resource.
}
FooCheck( )
{
  // checks the resource state
}
FooDiscovery( )
{
   switch(AttrNameToBeDiscovered)
   {
   case Attr1:
    discover_attr1( );
    break;
   case Attr2:
    disover_attr2( )
    break;
   };
}
FooResAttrModified(attributeName, attributeValue) {
switch(ModifedAttrName)
{
case Attr1:
   send_notification_to_clientx(attributeName);
   break;
case Attr2:
   TuneResource(attributeName, attributeValue);
   break;
}
}
```

The foregoing example implementation of the discovery 210 entry point utilizes a 'switch' command to discover the values for the attributes, 'Attr1' and 'Attr2', via functions 'discover_attr1( )' and 'discover_attr2( )', respectively. These functions comprise the resource type-specific user-defined instructions for discovering the values for the respective resource attributes, however is necessary for the particular resource type. A call to the discovery 210 entry point would need to include any input parameters and types that may be specified in the function definition and/or switch command, and the functions would return any return values and types that are specified, if applicable.

The foregoing example implementation of the attribute changed 212 entry point ('ResAttrModified') utilizes a 'switch' command to perform certain actions in response to a new attribute value, 'attributeValue', for a particular attribute, 'attributeName'. For attribute 'Attr1', the responsive action is to send a notification to 'clientx' with a payload comprising the 'attributeName' to notify the client that the particular named attribute has changed. For attribute 'Attr2', the responsive action is to tune the resource, with a payload comprising the 'attributeName' and the current corresponding 'attributeValue'. The 'send_notification_to_client' and 'TuneResource' functions comprise the resource type-specific user-defined instructions for performing certain actions in response to a new attribute value, based on particular users' desires for the particular resource type. Similarly to the discovery 210 entry point, a call to the 'ResAttrModified' functions would need to include any input parameters and types that may be specified in the function definition and/or switch command, and the functions would return any return values and types that are specified, if applicable.

A Method for Managing Dynamic Resource Attributes

Figure 3:
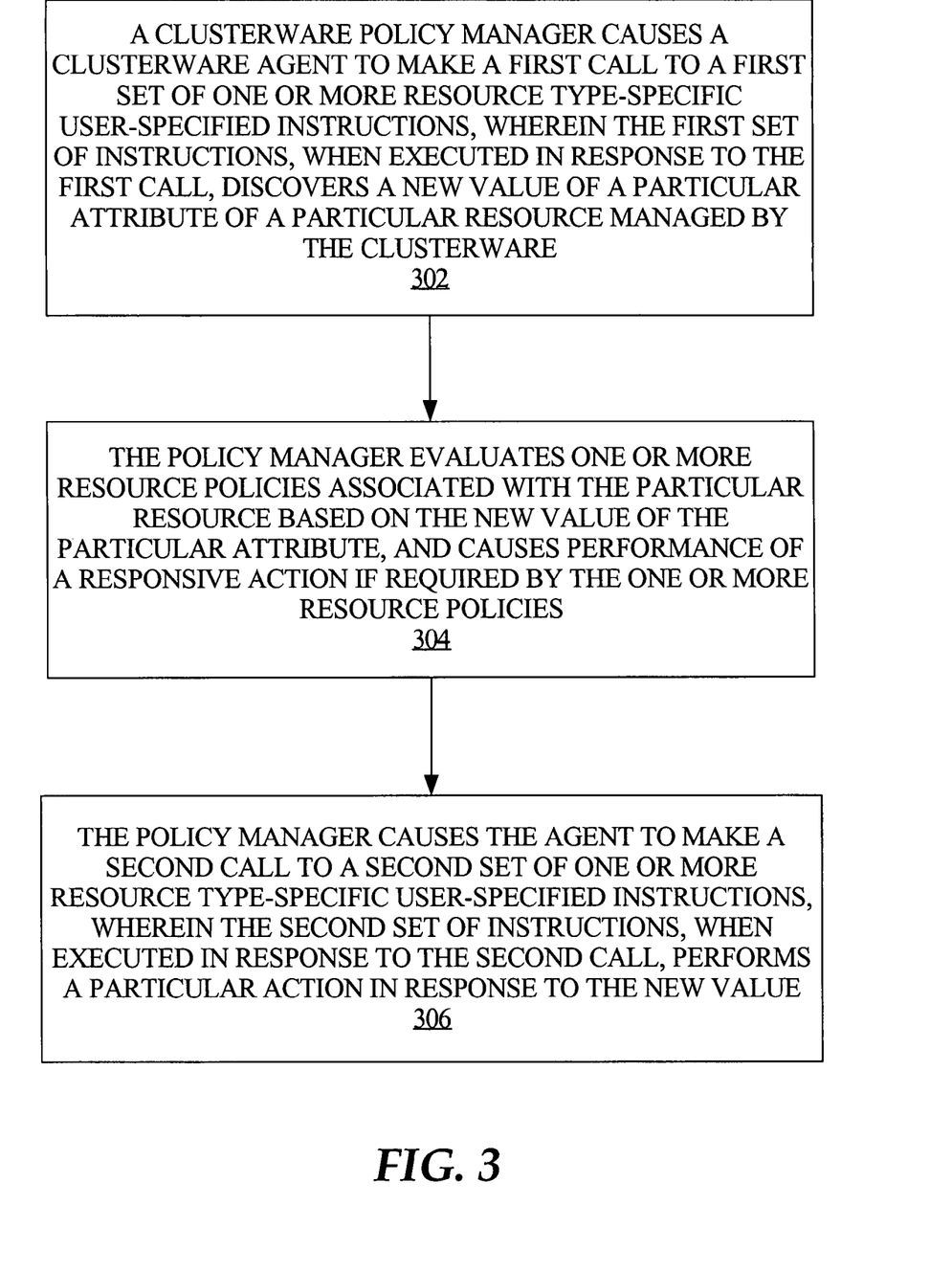
FIG. 3 is a flow diagram that illustrates a method for managing dynamic resource attributes, according to an embodiment of the invention.

FIG. 3 is a flow diagram that illustrates a method for managing dynamic resource attributes, according to an embodiment of the invention. The method depicted in FIG. 3 is a computer and/or machine-implemented method in which a computer or machine performs the method, such as by one or more processors executing instructions. For example, the method may be performed on or by a computer system such as computer system 400 of FIG. 4.

At block 302, cause a call to a first set of one or more instructions which, when executed in response to the call, cause performance of one or more operations for discovering a new value of a particular attribute of a particular resource managed by a clusterware application. For example, policy manager 202 (FIG. 2) of clusterware 102 (FIG. 2) requests agent 204 (FIG. 2) of clusterware 102 invoke the resource type-specific user-specified instructions associated with discovery 210 (FIG. 2) entry point, which performs whatever operations are necessary to determine the current value of the particular attribute of the particular resource. Hence, the discovery 210 entry point provides for discoverable resource attribute values which can change at any time, including at runtime.

Any number of events could trigger causing a call to the discovery 210 (FIG. 2) entry point. For example, if an attribute value is not be set at clusterware 102 (FIG. 2) configuration time, the policy manager 202 (FIG. 2) is aware that a value is needed for that attribute, e.g., via the resource profile 206 (FIG. 2), so the policy manager 204 periodically polls (or periodically causes the agent 204 to poll) the discovery 210 entry point to discover the attribute value. For another example, a notification mechanism within the clustered computing system publishes or otherwise notifies the clusterware 102 that a change has been made to an attribute value, where such may be made externally and manually by a system administrator or internally and automatically by the cluster system, and where such notification is passed to the policy manager 202 of the clusterware 102. Thus, in response to the notification, the policy manager 202 causes invocation of the discovery 210 entry point of agent 204 to discover the new attribute value. According to an embodiment, certain events that are to trigger invocation of the discovery 210 entry point are specified in the resource profile 206 associated with a particular type of resource, so that the policy manager 202 and agent 204 can respond to instances of such certain events to discover a resource attribute's current value.

In some scenarios, a change to an attribute's value may be temporary, whereby the attribute returns to its configured value, for example, upon completion of an operation using the resource, upon inactivating the resource, in response to a change to another interdependent resource and/or resource attribute, and the like. In such a scenario, the new attribute value is not stored persistently in non-volatile memory, rather the new attribute value is maintained in volatile memory for some length of time, and is flushed from this memory at some point in time. However, according to an embodiment, an attribute's new value is persistently stored in non-volatile memory and, therefore, is made relatively "permanent", i.e., until the new value is overwritten in non-volatile memory by another new value. For example, in response to discovering a change to a resource attribute value via the discovery 210 (FIG. 2) entry point mechanism, policy manager 202 (FIG. 2) may update the attribute value defined in resource-specific attribute 216 (FIG. 2) of resource profile 206 (FIG. 2), and store the resource profile 206 persistently in a cluster configuration data structure in non-volatile storage repository. Thus, attribute value changes are tolerant of node failures/reboots and can survive across cluster transitions. For example, when nodes in the cluster are rebooted, such as in response to a failure, clusterware 102 (FIG. 2) should restore the discovered attribute value to the value being used just prior to the reboot.

At block 304, one or more resource policies associated with the particular resource are evaluated based on the new value of the particular attribute, and a responsive action is caused to be performed if required by the one or more resource policies. For example, policy manager 202 (FIG. 2) of clusterware 102 (FIG. 2) evaluates policy attributes 218 (FIG. 2) of resource profile 206 (FIG. 2) to determine what to do in view of the newly changed value for the particular attribute. For example, the policy attributes 218 of resource profile 206 for resource 214a (FIG. 2), a database server, may specify that an instance of the database server must always be running on at least one node in the cluster and that if a node fails, then the database server executing on that node should failover to another node. Thus, if an attribute of the database server indicates that the instance on Node A (FIG. 1) is down (e.g., the attribute changes from 'active' to 'inactive'), then the policy manager 202 performs whatever operations are necessary to transfer sessions with the database server from Node A to Node B. For example, database and virtual IP address resources of Node A may be transferred over to Node B so that sessions with the database do not experience down time, in consideration of high availability goals of clusterware 102. Any number and type of resource management policies associated with clusterware 102 may be implemented in response to changes in resource attribute values, through use of at least policy attribute(s) 218 specified in resource profile 206 for a particular resource type, with evaluation of such policy attributes by policy manager 202 and performance of responsive action(s) thereto.

At block 306, cause a call to a second set of one or more instructions which, when executed in response to the call, cause performance of a certain action in response to the new value of the particular attribute of the particular resource managed by the clusterware application, where the new value was discovered via block 302. For example, policy manager 202 of clusterware 102 (FIG. 2) requests agent 204 (FIG. 2) of clusterware 102 invoke the resource type-specific user-specified instructions associated with attribute changed 212 (FIG. 2) entry point, which performs whatever operations are necessary perform whatever action is represented by the user-specified instructions in response to the change in value of the particular attribute of the particular resource. Hence, the attribute changed 212 entry point provides for any responsive actions to resource attribute values which change at any time, including at runtime. Furthermore, the attribute changed 212 entry point may include numerous steps, for non-limiting examples, executing a script, issuing a UNIX command, or publishing an event.

Example Use of Discovery and Attribute Changed Entry Points

Assume each clusterware-managed resource is configured with a resource profile with the attributes required to define the resource and the resource's high availability ("HA") requirements. However, the attributes need not be populated at clusterware configuration time. For example, consider a Database Resource, whose profile will consist of a list of attribute-value pairs:

(a) Resource Name,
(b) Resource Type,
(c) Database Unique Name,
(d) Timeout Value.

The attributes (a), (b) and (d) may be available at configuration time, but the value of the attribute Database Unique Name is constantly changing, or dynamic in nature. Thus, the attributes (a), (b) and (d) are populated by the policy manager 202 (FIG. 2) at clusterware configuration time.

The individual agent 204 (FIG. 2) that is monitoring the particular Database Resource can invoke the discovery 210 (FIG. 2) entry point to query the value of the Database Unique Name attribute. Once the policy manager 202 (FIG. 2) has discovered the value of the Database Unique Name attribute through the discovery 210 (FIG. 2) entry point, the policy manager 202 invokes the attribute changed 212 (FIG. 2) entry point for the agent 204, to inform the administrators/users about the change to the Database Unique Name attribute. The attribute changed 212 entry point may cause a script to be executed or an event to be published to let the users and interested parties know about the change for the Database Unique Name attribute. This approach and example allows the resource profile of a clusterware resource to be updated at any time without stopping the resource, and also informs the interested parties about the change.

Hardware Overview

Figure 4:
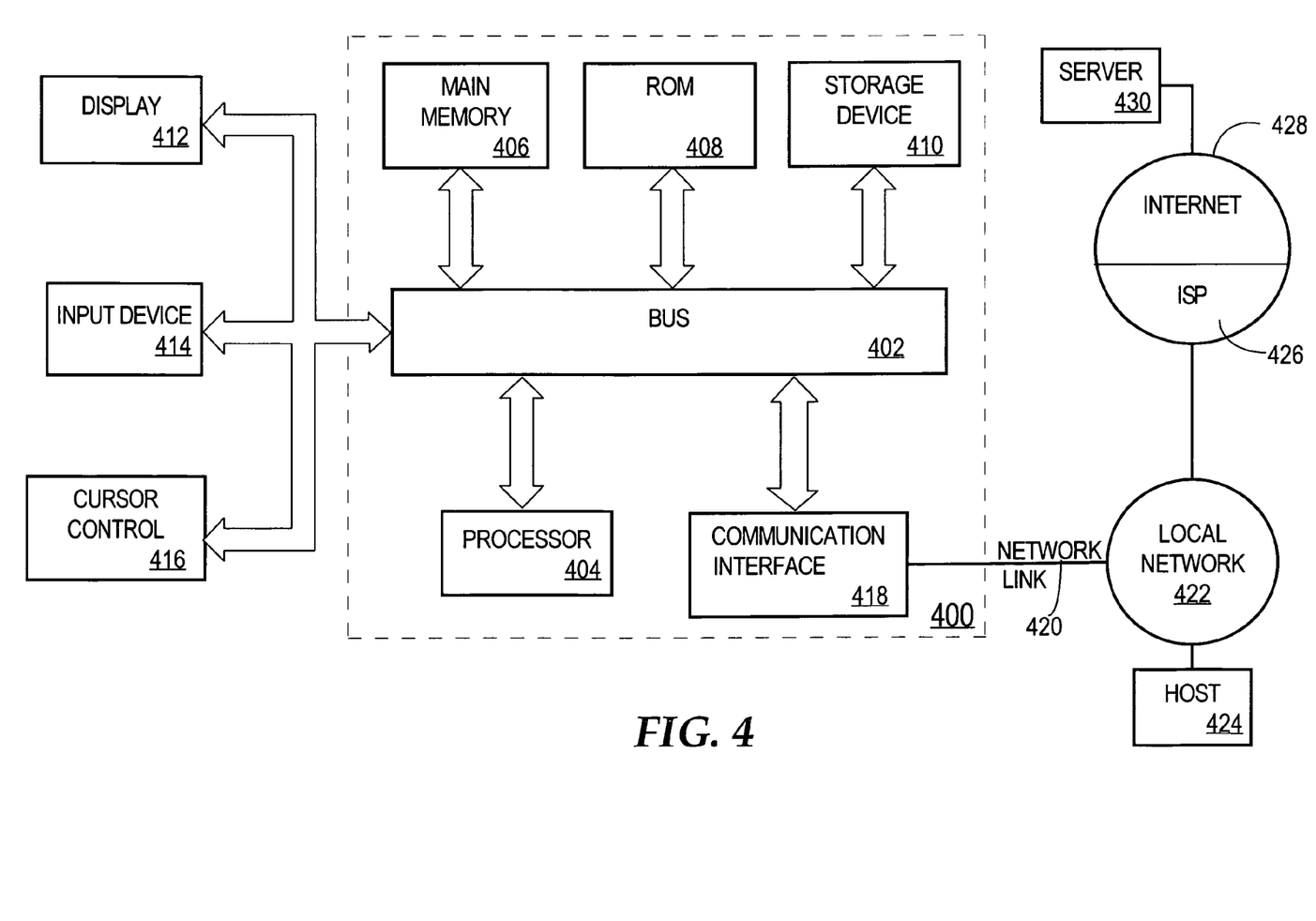
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by one or more computing devices in response to executing instructions of clusterware, the method comprising steps of:
    maintaining a plurality of resource profiles for a plurality of resources, wherein each resource of the plurality of resources is configured with a resource profile of the plurality of resource profiles, and wherein the resource profile includes a plurality of resource-specific attribute values that define the resource to the clusterware as the clusterware manages operation of the resource in a cluster;
    causing a particular resource to begin operating in the cluster according to a particular plurality of resource-specific attribute values that define the particular resource and are specified in a particular resource profile for said particular resource;
    while said particular resource is operating in the cluster in response to said causing said particular resource to begin operating in the cluster, and without stopping operation of the particular resource in the cluster, the one or more computing devices performing each of the following:
        detecting a particular attribute value of said particular plurality of resource-specific attribute values has changed to a new attribute value;
        in response to detecting said particular attribute value has changed to said new attribute value, causing said particular resource to operate in the cluster according to said new attribute value and causing said clusterware to continue managing operation of the particular resource in the cluster according to said new attribute value;
    wherein the clusterware uses the particular attribute value to define the particular resource before the particular attribute value changed to the new attribute value, and wherein the clusterware continues to manage operation of the particular resource by using the new attribute value to define the particular resource after the particular attribute value changed to the new attribute value.

2. The method of claim 1, the method further comprising:
    identifying a particular attribute of said particular resource as a dynamic attribute based on said particular resource profile.

3. The method of claim 2, wherein said identifying comprises identifying said particular attribute as a dynamic attribute of said particular resource based on a syntactic identifier associated with said particular attribute in said particular resource profile.

4. The method of claim 1, the method further comprising:
    causing a first call to a first set of one or more instructions, wherein said first set of one or more instructions, when executed in response to said first call, cause discovery of said new attribute value of a particular attribute of said particular resource.

5. The method of claim 4, the method further comprising:
    causing a second call to a second set of one or more instructions, wherein said second set of one or more instructions, when executed in response to said second call, causes performance of a user-defined action in response to discovery of said new attribute value of said particular attribute.

6. The method of claim 5, wherein causing said first call and causing said second call are performed by a resource policy manager of said clusterware, and wherein said first and second calls are made by an agent of said clusterware, and wherein said agent is specific to a type of resource with which said particular resource is associated.

7. The method of claim 5, wherein said particular resource is a particular type of resource, and wherein said first set of one or more instructions and said second set of one or more instructions are user-defined and specific to said particular type of resource.

8. The method of claim 5, the method further comprising:
    evaluating one or more resource policies associated with said particular resource in view of said new attribute value; and
    wherein said one or more resource policies specify a particular action to be performed in response to said new attribute value; and
    causing performance of said particular action.

9. The method of claim 4, wherein causing said first call to said first set of one or more instructions is performed in response to a manual change to said particular attribute of said particular resource.

10. The method of claim 4, wherein causing said first call to said first set of one or more instructions is performed in response to automatic invalidation, after a certain time interval, of a value for said particular attribute of said particular resource.

11. The method of claim 4, the method further comprising:
    determining that said particular attribute of said particular resource is specified as having a persistent value;
    in response to determining that said particular attribute of said particular resource is specified as having a persistent value, persistently storing said new attribute value in a cluster configuration repository;
    in response to rebooting said cluster or rebooting a node in said cluster, retrieving said new attribute value of said particular attribute of said particular resource from said cluster configuration repository; and
    managing said particular resource according to said new attribute value.

12. One or more non-transitory computer-readable storage media comprising one or more instructions of clusterware which, when executed by one or more processors, cause the one or more processors to perform:

maintaining a plurality of resource profiles for a plurality of resources, wherein each resource of the plurality of resources is configured with a resource profile of the plurality of resource profiles, and wherein the resource profile includes a plurality of resource-specific attribute values that define the resource to the clusterware as the clusterware manages operation of the resource in a cluster;

causing a particular resource to begin operating in the cluster according to a particular plurality of resource-specific attribute values that define the particular resource and are specified in a particular resource profile for said particular resource;

while said particular resource is operating in the cluster in response to said causing said particular resource to begin operating in the cluster, and without stopping operation of the particular resource in the cluster, the one or more instructions, when executed, causing the one or more processors to perform each of the following:

detecting a particular attribute value of said particular plurality of resource-specific attribute values has changed to a new attribute value;

in response to detecting said particular attribute value has changed to said new attribute value, causing said particular resource to operate in the cluster according to said new attribute value and causing said clusterware to continue managing operation of the particular resource in the cluster according to said new attribute value;

wherein the clusterware uses the particular attribute value to define the particular resource before the particular attribute value changed to the new attribute value, and wherein the clusterware continues to manage operation of the particular resource by using the new attribute value to define the particular resource after the particular attribute value changed to the new attribute value.

13. One or more non-transitory computer-readable storage media as recited in claim 12, wherein the one or more instructions of clusterware which, when executed by the one or more processors, further cause the one or more processors to perform:

identifying a particular attribute of said particular resource as a dynamic attribute based on said particular resource profile.

14. One or more non-transitory computer-readable storage media as recited in claim 13, wherein the one or more instructions of clusterware which, when executed by the one or more processors, cause the one or more processors to perform said identifying by identifying said particular attribute as a dynamic attribute of said particular resource based on a syntactic identifier associated with said particular attribute in said particular resource profile.

15. One or more non-transitory computer-readable storage media as recited in claim 12, wherein the one or more instructions of clusterware which, when executed by the one or more processors, further cause the one or more processors to perform:

causing a first call to a first set of one or more instructions, wherein said first set of one or more instructions, when executed in response to said first call, cause discovery of said new attribute value of a particular attribute of said particular resource.

16. One or more non-transitory computer-readable storage media as recited in claim 15, wherein the one or more instructions of clusterware which, when executed by the one or more processors, further cause the one or more processors to perform:

causing a second call to a second set of one or more instructions, wherein said second set of one or more instructions, when executed in response to said second call, causes performance of a user-defined action in response to discovery of said new attribute value of said particular attribute.

17. One or more non-transitory computer-readable storage media as recited in claim 16, wherein the one or more instructions of clusterware which, when executed by the one or more processors, cause the one or more processors to perform said causing said first call and causing said second call by a resource policy manager of said clusterware, and wherein said first and second calls are made by an agent of said clusterware, and wherein said agent is specific to a type of resource with which said particular resource is associated.

18. One or more non-transitory computer-readable storage media as recited in claim 16, wherein said particular resource is a particular type of resource, and wherein said first set of one or more instructions and said second set of one or more instructions are user-defined and specific to said particular type of resource.

19. One or more non-transitory computer-readable storage media as recited in claim 16, wherein the one or more instructions of clusterware which, when executed by the one or more processors, further cause the one or more processors to perform:

evaluating one or more resource policies associated with said particular resource in view of said new attribute value; and wherein said one or more resource policies specify a particular action to be performed in response to said new attribute value; and causing performance of said particular action.

20. One or more non-transitory computer-readable storage media as recited in claim 15, wherein the one or more instructions of clusterware which, when executed by the one or more processors, cause the one or more processors to perform said causing said first call to said first set of one or more instructions in response to a manual change to said particular attribute of said particular resource.

21. One or more non-transitory computer-readable storage media as recited in claim 15, wherein the one or more instructions of clusterware which, when executed by the one or more processors, cause the one or more processors to perform said causing said first call to said first set of one or more instructions in response to automatic invalidation, after a certain time interval, of a value for said particular attribute of said particular resource.

22. One or more non-transitory computer-readable storage media as recited in claim 15, wherein the one or more instructions of clusterware which, when executed by the one or more processors, further cause the one or more processors to perform:

determining that said particular attribute of said particular resource is specified as having a persistent value;

in response to determining that said particular attribute of said particular resource is specified as having a persistent value, persistently storing said new attribute value in a cluster configuration repository;

in response to rebooting said cluster or rebooting a node in said cluster, retrieving said new attribute value of said particular attribute of said particular resource from said cluster configuration repository; and managing said particular resource according to said new attribute value.

23. The method of claim 1, the method further comprising, while said particular resource is operating in the cluster in response to said causing said particular resource to begin operating in the cluster, and without stopping the particular resource, causing, in response to detecting said particular attribute value has changed to said new attribute value, performance of a particular action on a dependent resource, wherein the dependent resource depends on the particular resource.

24. The method of claim 23, wherein performance of the particular action on the dependent resource is accomplished while said dependent resource is operating in the cluster, and without stopping the dependent resource.

25. The method of claim 23, wherein performance of the particular action on the dependent resource comprises starting the dependent resource.

26. The method of claim 23, wherein performance of the particular action on the dependent resource comprises stopping the dependent resource.

27. One or more non-transitory computer-readable storage media as recited in claim 12, wherein the one or more instructions of clusterware which, when executed by the one or more processors, further cause, while said particular resource is operating in the cluster in response to said causing said particular resource to begin operating in the cluster, and without stopping the particular resource, causing, in response to detecting said particular attribute value has changed to said new attribute value, performance of a particular action on a dependent resource, wherein the dependent resource depends on the particular resource.

28. One or more non-transitory computer-readable storage recited in claim 27, wherein performance of the particular action on the dependent resource is accomplished while said dependent resource is operating in the cluster, and without stopping the dependent resource.

29. One or more non-transitory computer-readable storage recited in claim 27, wherein performance of the particular action on the dependent resource comprises starting the dependent resource.

30. One or more non-transitory computer-readable storage recited in claim 27, wherein performance of the particular action on the dependent resource comprises stopping the dependent resource.

* * * * *

UNITED STATES PATENT AND TRADEMARK OFFICE
CERTIFICATE OF CORRECTION

PATENT NO. : 8,209,417 B2
APPLICATION NO. : 11/716244
DATED : June 26, 2012
INVENTOR(S) : Kakarla et al.

Page 1 of 1

It is certified that error appears in the above-identified patent and that said Letters Patent is hereby corrected as shown below:

In column 4, line 11, delete "//intial value" and insert -- "//initial value" --, therefor.

In column 18, line 10, in Claim 28, delete "storage" and insert -- storage media as --, therefor.

In column 18, line 15, in Claim 29, delete "storage" and insert -- storage media as --, therefor.

In column 18, line 19, in Claim 30, delete "storage" and insert -- storage media as --, therefor.

Signed and Sealed this
Twenty-fifth Day of September, 2012

David J. Kappos
*Director of the United States Patent and Trademark Office*